United States Patent [19]
Zakhi

[11] 3,865,431
[45] Feb. 11, 1975

[54] VEHICLE BUMPER SEAT
[76] Inventor: Victor Zakhi, 124 South Hadley Rd., Fort Wayne, Ind. 46804
[22] Filed: Oct. 25, 1973
[21] Appl. No.: 409,654

[52] U.S. Cl.................... 297/217, 108/44, 248/14, 248/287
[51] Int. Cl........................................... A47c 15/00
[58] Field of Search.......... 297/217; 108/42, 44, 47; 248/214, 287, 240.3, 240.4

[56] References Cited
UNITED STATES PATENTS

| | | | |
|---|---|---|---|
| 957,324 | 5/1910 | Gall | 248/214 X |
| 2,142,263 | 1/1939 | Bentz | 108/47 X |
| 2,601,888 | 7/1952 | Schopper | 248/214 |
| 2,659,603 | 11/1953 | Glasser | 248/287 X |
| 2,698,048 | 12/1954 | Schweizer | 248/214 |
| 2,718,445 | 9/1955 | Wilson | 108/44 |
| 2,781,081 | 2/1957 | Hynes | 248/214 |
| 2,833,608 | 5/1958 | Tobias | 108/44 |
| 3,037,639 | 6/1962 | Kost | 108/47 X |
| 3,289,611 | 12/1966 | Flanders | 108/44 |

Primary Examiner—Roy D. Frazier
Assistant Examiner—William E. Lyddane

[57] ABSTRACT

A seat adapted to be removably attached to the bumper of a vehicle such as an automobile, the seat comprising a seat frame having a seating panel affixed thereto, a vertical frame secured to the rearwardly disposed end of the seating frame and extending vertically upwardly therefrom, and a plurality of hook elements adapted to hookingly engage the edge of a bumper when the supporting frame is in abutting engagement with the outer surface thereof.

3 Claims, 2 Drawing Figures

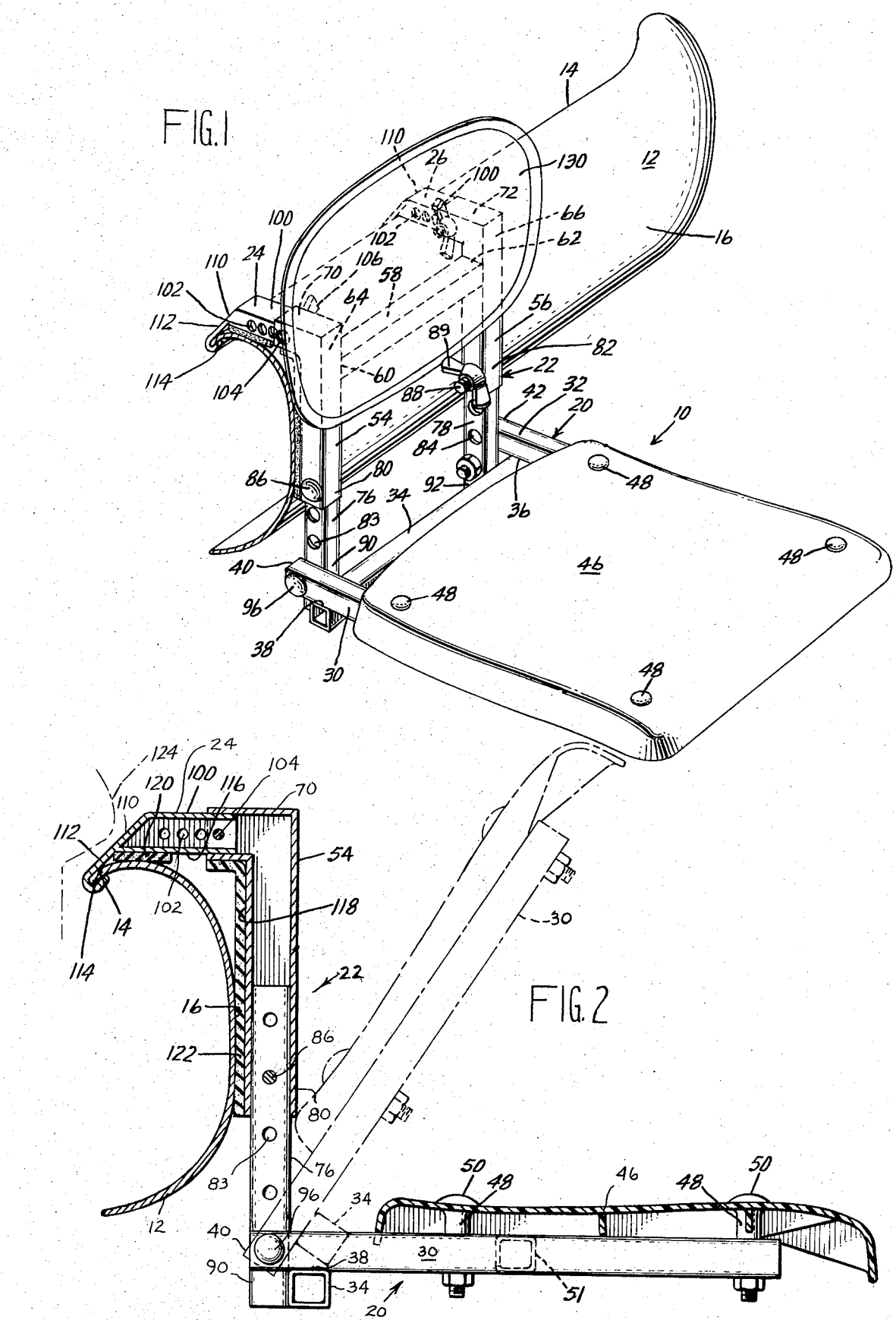

VEHICLE BUMPER SEAT

BACKGROUND OF THE INVENTION

1. Field of the Invention

The present invention relates to portable seats and in particular to a portable seat which is adapted to be removably mounted to the bumper of a vehicle such as an automobile or truck.

2. Description of the Prior Art

Portable seats or chairs are well known and include articles such as the common folding chair, beach chairs, camp stools, and the like. One such type of portable chair is disclosed in patents such as U.S. Pat. No. 2,781,081 to Hynes. This type of portable chair is adapted to be removably mounted to the bumper of a vehicle such as an automobile. The chair, when not in use, is removed from the bumper and stored in a convenient place such as a trunk of the auto. However, such chairs heretofore known in the prior art, while they have exhibited the advantage of simplicity and small size by reason of the elimination of legs, have not been universally adapted for use on the wide variety of shapes and sizes of bumpers of typical vehicles. Further, the seating height of such chairs has been essentially dictated by the height of a vehicle bumper. Similarly, bumpers of many present day vehicles are recessed into the body panels of the vehicle whereby the spacing between the upper edge of the bumper and the vehicle body panels is frequently relatively small.

SUMMARY OF THE INVENTION

The present invention is a seat adapted to be removably mounted to the bumper of a vehicle such as an automobile. The seat comprises a seating frame and a supporting frame, the supporting frame being coupled to the rearwardly disposed end of the seating frame and extending vertically upwardly therefrom. A seating panel is fixedly secured to the seating frame and a plurality of hook elements are secured to the distal end of the supporting frame. The hook elements are rearwardly and downwardly tapered at their distal ends and include downwardly and rearwardly extending fingers. The distal ends of the fingers are folded backwardly beneath themselves to define hooks. The hook elements, by reason of their taper and the finger portions thereof are readily inserted into even the narrow clearances frequently encountered in present day vehicles.

In a specific embodiment of the invention, the hook elements have a longitudinally adjustable length whereby the horizontal spacing between the hooks and the supporting frame can be readily adjusted for use with vehicles having widely different bumper configurations. In another specific embodiment of the invention, the supporting frame has a longitudinally adjustable length whereby the seating height of the seating panel can be adjusted both for differences in the height of the bumper and for use by individuals of different sizes. In yet another specific embodiment of the invention, the seat frame and supporting frame are hingedly coupled whereby the seat may be folded for more compact storage thereof.

BRIEF DESCRIPTION OF THE DRAWINGS

FIG. 1 is a perspective view of the seat of the present invention shown partially in phantom and affixed to a typical vehicle bumper; and FIG. 2 is a sectional side plan view of a seat in accordance with the present invention also shown affixed to a typical bumper.

DESCRIPTION OF A SPECIFIC EMBODIMENT

Referring now to the drawings, there is shown in FIG. 1, a bumper seat, indicated generally at 10 which is mounted on a bumper 12. It will be understood that bumper 12 may be either the front or rear bumper of a vehicle (not shown) and is typical thereof, bumper 12 being formed of heavy gauge sheet steel or the like and having an upper edge 14 and a face 16.

Bumper seat 10 comprises a seat frame 20, a supporting frame indicated generally at 22, and a plurality of hook elements as at 24, 26. Seat frame 20 includes a pair of parallel, laterally spaced-apart members 30, 32. Members 30, 32 may be made of tubular steel of rectangular cross-section. A lateral seat-frame member 34 extends laterally between and under frame members 30, 32 securing the latter together as by welding at 36, 38. Member 34 is secured in a position spaced from the ends 40, 42 of members 30, 32, respectively, by a dimension equal to the width thereof for a reason to be explained below.

A seat panel 46 overlies members 30, 32 and is secured thereto by a plurality of threaded fasteners 48. Preferably, fasteners 48 have smooth rounded heads 50. Seating panel 46 may be made of wood or, in a preferred embodiment, is molded from a suitable plastic such as polyvinyl chloride, panel 46 having a contour designed to provide a comfortable seating surface.

A second laterally extending seat-frame member 51, (FIG. 2 only) extends laterally between members 30, 32 and is secured as by welding, member 51 providing additional reinforcement to seat frame 20.

Supporting frame 22 includes a pair of vertically extending tubular members 54, 56 of rectangular cross-section. Members 54, 56 are secured together by a laterally extending supporting frame member 58 as by welding at 60, 62. The upper ends 64, 66 of members 54, 56 are provided with horizontal (as viewed in the drawings) socket portions 70, 72, respectively. Socket portions 70, 72 are also hollow and of rectangular cross-section.

A pair of slide members 76, 78 of rectangular cross-section are slidably received in telescopic relationship within members 54, 56. Slide members 76, 78 are of about the same length as members 54, 56 whereby they can be almost fully received within members 54, 56. Ends 80, 82 of members 54, 56 are provided with through holes (not shown) and slide members 76, 78 are each provided with a plurality of longitudinally spaced-apart through holes as at 83, 84. Holes 83, 84 are positioned such that pairs thereof will move into registry with the through holes in member ends 80, 82 as slide members 76, 78 are moved vertically within members 54, 56.

Suitable threaded fasteners 86, 88 are received through the holes in member ends 80, 82 and appropriate pairs of through holes 83, 84 and secured as by a wing nut 89 to thereby selectively couple slide member 76, 78 to members 54, 56 in a selected position with respect thereto.

Seat frame members 30, 32 are hingedly coupled to the lower ends 90, 92 of slide members 76, 78 by means of suitable threaded fasteners as at 96. As best seen in FIG. 2, seat-frame member 34 abuttingly engages the ends 90, 92 of slide members 76, 78 when seat frame 20 is in its lowered position as shown in FIG. 1 and in solid lines in FIG. 2. This abutting engagement limits the downward pivotal movement of the seat frame 20. The hinged coupling of the seat frame 20 to slide member 76, 78 further enables the seat frame 20 and seat panel 46 to be pivoted upwardly to the position indicated in dotted lines of FIG. 2 for more compact storage of the bumper seat 10.

Hook elements 24, 26 are identical and each includes a slide portion 100 which is telescopically, slidably received within portions 70, 72 of supporting frame 22. Slide portions 100 are movable from an extended position, illustrated, to a retracted position in which they are almost entirely received within portions 70, 72. Slide portions 100 are provided with a plurality of longitudinally spaced-apart through holes as at 102 and portions 70, 72 are each provided with a through hole (not shown), predetermined ones of holes 102 being in registry with the holes in portions 70, 72 as the slide portions 100 are moved inwardly and outwardly therein. Suitable threaded fasteners 104 are received through the portions 70, 72 and holes 102 and secured by means of wing nuts 106 to thereby secure the slide portions 100 in selected position.

The distal ends 110 of slide portions 100 are downwardly and rearwardly tapered as best seen in FIG. 2 and include a finger portion 112 which extends downwardly and rearwardly at an angle from the distal ends 110.

The distal ends of the finger portions 112 are in turn rolled or bent backwardly beneath themselves as best seen in FIG. 2 to thereby define notches 114. Notches 114 are dimensioned to freely and slidably receive the edge 14 of bumper 12 therein.

Preferably, the bottom surfaces 116 of slide portions 100 and the back surfaces 118 of supporting frame members 54, 56 are fitted with suitable resilient pads 120, 122, respectively, to prevent scratching of the bumper 12, pads 120, 122 being secured by means of a suitable adhesive.

It will be observed in FIG. 2 that the downwardly and rearwardly tapered ends of slide portions 100 permit same to be secured to the bumper 12 of vehicles even when the bumpers are partially recessed into the body sheet metal (indicated by dashed lines 124 in FIG. 2). The selected telescopic engagement of the slide portions 100 with the portions 70, 72 permits adjustment of the hook elements such that the bumper seat 10 can be secured to bumpers of different depths while simultaneously permitting the seating panel 46 to, at all times, remain in a substantially horizontal position. The telescopic engagement of the elements 76, 78 with the supporting frame members 54, 56 permits vertical adjustment of the sitting height of the seating panel 46. This permits the seat or sitting height to be adjusted both for different sized individuals and for different height bumpers. The seat is illustrated as being foldable which further enhances the storability thereof. In a preferred embodiment of the invention, the supporting frame 22 is further fitted with a back seat panel 130 which may be secured by means of suitable threaded fasteners (not shown). Preferably, panel 130 is also made of molded plastic which is both durable and which can be easily contoured for comfortable seating.

While an embodiment of the invention has been illustrated with specific structure, various modifications thereof will be obvious to those skilled in the art. For example, the slide portions 100 and the supporting frame members 54, 56 can be manufactured in non-telescoping embodiments and the seat frame 20 can be fixedly and ridgedly secured to the supporting frame 22 in instances where adjustability and compactness are less important than manufacturing cost.

While there have been described above the principles of this invention in connection with specific apparatus, it is to be clearly understood that this description is made only by way of example and not as a limitation to the scope of the invention.

What is claimed is:

1. A seat assembly for removable attachment to a portion of a vehicle comprising: a seat frame having forward and rear ends and having a seat panel secured thereto, a supporting frame having lower and upper ends and having a back rest panel secured thereto, first means for connecting said forward end of said seat frame to said supporting frame adjacent said lower end thereof, a pair of hook elements respectively having forward and rear ends, and second means for adjustably connecting said rear ends of said hook elements to said upper end of said supporting frame with said hook elements extending forwardly from said supporting frame and being selectively adjustable with respect thereto between extended and retracted positions, said distal ends of said hook elements having hook portions thereon adapted to engage said vehicle portion thereby to support said assembly thereon with said supporting frame depending from said hook elements and said seat frame extending rearwardly from said supporting frame, said seat frame comprising a pair of spaced, paralled members having forward and rear ends and a lateral member connecting said parallel members and spaced from said forward ends thereof, said first connecting means pivotally connecting said forward ends of said parallel members to points on said supporting frame spaced from said lower end thereof thereby permitting upward pivotal movement of said seat frame and seat panel between lower and storage positions, said lateral member engaging said lower end of said supporting frame in said lower position thereby limiting downward pivotal movement of said seat frame and supporting the same in said lower position thereof.

2. The assembly of claim 1 wherein said second connecting means comprises a pair of tubular socket portions connected to and extending forwardly from said upper end of said supporting frame, said rear ends of said hook elements being adjustably, telescopically received in said socket portions, and means for securing said distal ends in said socket portions at selected points between said extended and retracted positions.

3. The assembly of claim 1 wherein said supporting frame comprises a pair of spaced, parallel tubular members respectively having lower and upper ends, a lateral member connecting said tubular members, said tubular socket portions being respectively connected to said upper ends of said tubular members, a pair of spaced, parallel slide members respectively having lower and upper ends, said upper ends of said slide members being respectively adjustably, telescopically received in said lower ends of said tubular members, and means for securing said upper ends of said slide members in said lower ends of said tubular members at selected points between extended and retracted positions of said slide members with respect to said tubular members, said forward ends of said seat frame parallel members being respectively pivotally connected to said slide members at points spaced from said lower ends thereof, said seat frame lateral member engaging lower ends of said slide members in said lower position.

* * * * *